US010724590B2

(12) United States Patent
Filippi

(10) Patent No.: US 10,724,590 B2
(45) Date of Patent: Jul. 28, 2020

(54) HINGE FOR EYEGLASSES

(71) Applicant: LUXOTTICA S.R.L., Agordo (IT)

(72) Inventor: Umberto Filippi, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 68 days.

(21) Appl. No.: 16/065,715

(22) PCT Filed: Dec. 21, 2016

(86) PCT No.: PCT/EP2016/082222
§ 371 (c)(1),
(2) Date: Jun. 22, 2018

(87) PCT Pub. No.: WO2017/108982
PCT Pub. Date: Jun. 29, 2017

(65) Prior Publication Data
US 2019/0011726 A1 Jan. 10, 2019

(30) Foreign Application Priority Data

Dec. 23, 2015 (IT) .......................... 102015000086940

(51) Int. Cl.
F16D 65/097 (2006.01)
G02C 5/22 (2006.01)
(Continued)

(52) U.S. Cl.
CPC ..... F16D 65/0978 (2013.01); F16D 65/0006 (2013.01); F16D 65/0068 (2013.01);
(Continued)

(58) Field of Classification Search
CPC ............. F16D 65/0978; F16D 65/0006; F16D 65/0068; F16D 65/092; F16D 55/225;
(Continued)

(56) References Cited

U.S. PATENT DOCUMENTS 5,631,719 A 5/1997 Chao
6,857,738 B1 2/2005 Bove et al.

FOREIGN PATENT DOCUMENTS

CN 101688982 A 3/2010
CN 102216831 A 10/2011
(Continued)

OTHER PUBLICATIONS

CN Office Action dated Apr. 19, 2019 re: Application No. 201680074923.9, pp. 1-10, citing: CN102346315A, U.S. Pat. No. 6,857,738B1, CN102778760A, CN102216831A and CN101688982A.
(Continued)

Primary Examiner — Tuyen Tra
(74) Attorney, Agent, or Firm — Cantor Colburn LLP

(57) ABSTRACT

A hinge for eyeglasses, which includes first elements for pivoting to a front of eyeglasses, and second elements for pivoting to a temple of eyeglasses, and which include a leaf spring that defines a cavity. The second pivoting elements include an abutment head that can rotate about a rotation axis and is configured to be associated rigidly with one end of the temple. The abutment head includes a protrusion inserted into the cavity of the leaf spring so as to be retained in the cavity. The rotation of the abutment head about the rotation axis in a first direction of rotation produces the flexing of the leaf spring by the protrusion and the consequent rotation of the temple.

13 Claims, 2 Drawing Sheets

(51) Int. Cl.
*G02C 5/10* (2006.01)
*F16D 65/00* (2006.01)
*F16D 65/092* (2006.01)
*F16D 55/225* (2006.01)
*F16D 55/00* (2006.01)

(52) U.S. Cl.
CPC ............ *F16D 65/092* (2013.01); *G02C 5/10* (2013.01); *G02C 5/2254* (2013.01); *F16D 55/225* (2013.01); *F16D 2055/0016* (2013.01); *F16D 2200/0021* (2013.01); *F16D 2250/0084* (2013.01); *G02C 2200/22* (2013.01)

(58) Field of Classification Search
CPC ..... F16D 2055/0016; F16D 2200/0021; F16D 2250/0084; G02C 5/10; G02C 5/2254; G02C 2200/22
USPC .......................................... 351/41, 140, 153
See application file for complete search history.

(56) References Cited

FOREIGN PATENT DOCUMENTS

| | | |
|---|---|---|
| CN | 102346315 A | 2/2012 |
| CN | 102778760 A | 11/2012 |
| EP | 1469338 A1 | 10/2004 |
| EP | 2290431 A1 | 3/2011 |
| FR | 2864260 A1 | 6/2005 |
| FR | 2991467 A1 | 12/2013 |

OTHER PUBLICATIONS

International Search Report dated Mar. 29, 2017 re: Application No. PCT/EP2016/082222, pp. 1-4, citing: U.S. Pat. No. 6,857,738 B1, U.S. Pat. No. 5,631,719 A, EP 1 469 338 A1, FR 2 864 260 A1, FRR 2 991 467 A1 and EP 2 290 431 A1.
Written Opinion dated Mar. 29, 2017 re: Application No. PCT/EP2016/082222, pp. 1-7, citing: U.S. Pat. No. 6,857,738 B1, U.S. Pat. No. 5,631,719 A, EP 1 469 338 A1, FR 2 864 260 A1, FRR 2 991 467 A1 and EP 2 290 431 A1.

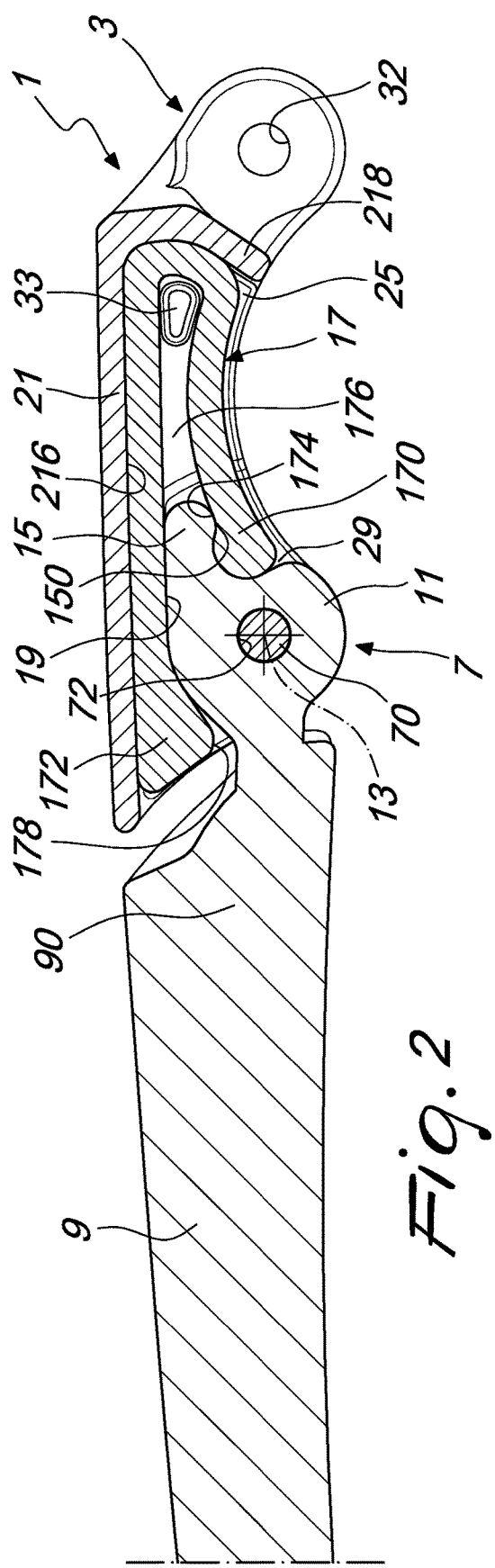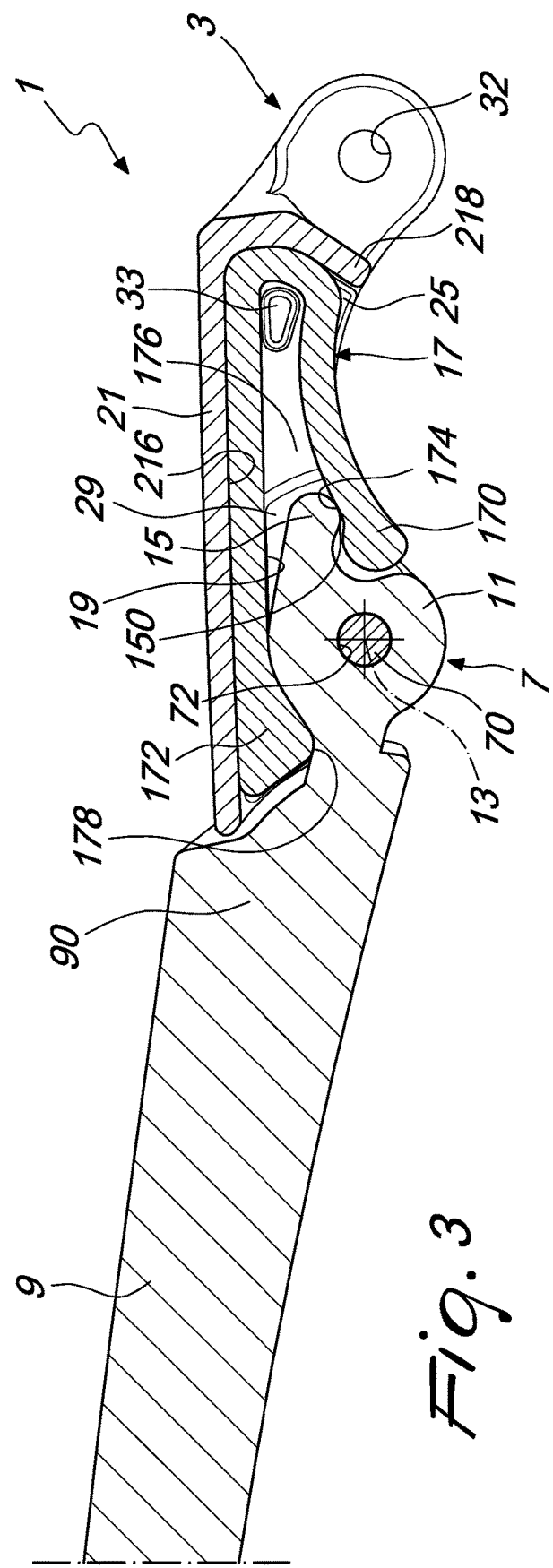

HINGE FOR EYEGLASSES

TECHNICAL FIELD

The present disclosure relates to a hinge for eyeglasses, and also to eyeglasses that comprise such hinge.

BACKGROUND

Currently eyeglasses are known which have, between the temples and the front, hinges that make it possible to slightly splay the temples with respect to the configuration of use.

Such over-opening of the temples facilitates the user in the act of wearing the eyeglasses and, during such operations, it prevents the hinges from being subjected to excessive opening forces, which could damage the hinge, but also the temples or the front of the eyeglasses.

The hinges that allow such over-opening are hinges of the elastic type, i.e. they are hinges that exert an elastic force to return the temples, in order to bring them from an optional over-open position to the normal open position that they have to maintain when the eyeglass frame is worn by the user.

Conventional hinges that make such over-opening possible however generally have complex structures, and the assembly of eyeglasses that mount such hinges generally requires the execution of many manual operations, with a consequent considerable increase in production and assembly times.

For example, conventional hinges use helical springs, which are accommodated in adapted cylindrical seats provided in the eyeglass frame proper, and are associated with tie rods that transmit to the temple the elastic return force required in order to move the temples to the normal open position.

It is evident that eyeglasses provided with such conventional hinges, in addition to difficulties in providing such components, also present difficulties and delays in the assembly operations.

SUMMARY

The aim of the present disclosure relates to providing a hinge for eyeglasses that compensates for the drawbacks and overcomes the limitations of the known art.

Within this aim, the present disclosure provides a hinge for eyeglasses that it is easy and rapid to produce, assemble and associate with eyeglasses.

The disclosure further provides a hinge for eyeglasses that is capable of offering the widest guarantees of reliability and safety in use.

The disclosure also provides a hinge for eyeglasses that is economically competitive if compared to the known art.

These advantages and others which will become better apparent hereinafter are achieved by providing a hinge for eyeglasses, which comprises first means for pivoting to a front of eyeglasses, and second means for pivoting to a temple of eyeglasses, characterized in that it comprises a leaf spring that defines a cavity and in that said second pivoting means comprise an abutment head that can rotate about a rotation axis and is configured to be associated rigidly with one end of said temple, said abutment head comprising a protrusion inserted into said cavity of said leaf spring so as to be retained in said cavity, the rotation of said abutment head about said rotation axis in a first direction of rotation producing the flexing of said leaf spring by said protrusion and the rotation of said temple.

BRIEF DESCRIPTION OF THE DRAWINGS

Further characteristics and advantages of the disclosure will become better apparent from the detailed description of a preferred, but not exclusive, embodiment of a hinge for eyeglasses, illustrated by way of non-limiting example with the aid of the accompanying drawings wherein:

FIG. 2 is a cross-sectional view of the hinge of FIG. 1, according to the disclosure, shown in a configuration of normal opening or closing of the temple; and FIG. 3 is a cross-sectional view of the hinge of FIG. 1, according to the disclosure, shown in a configuration of over-opening of the temple.

DETAILED DESCRIPTION OF THE DRAWINGS

Figure 1:
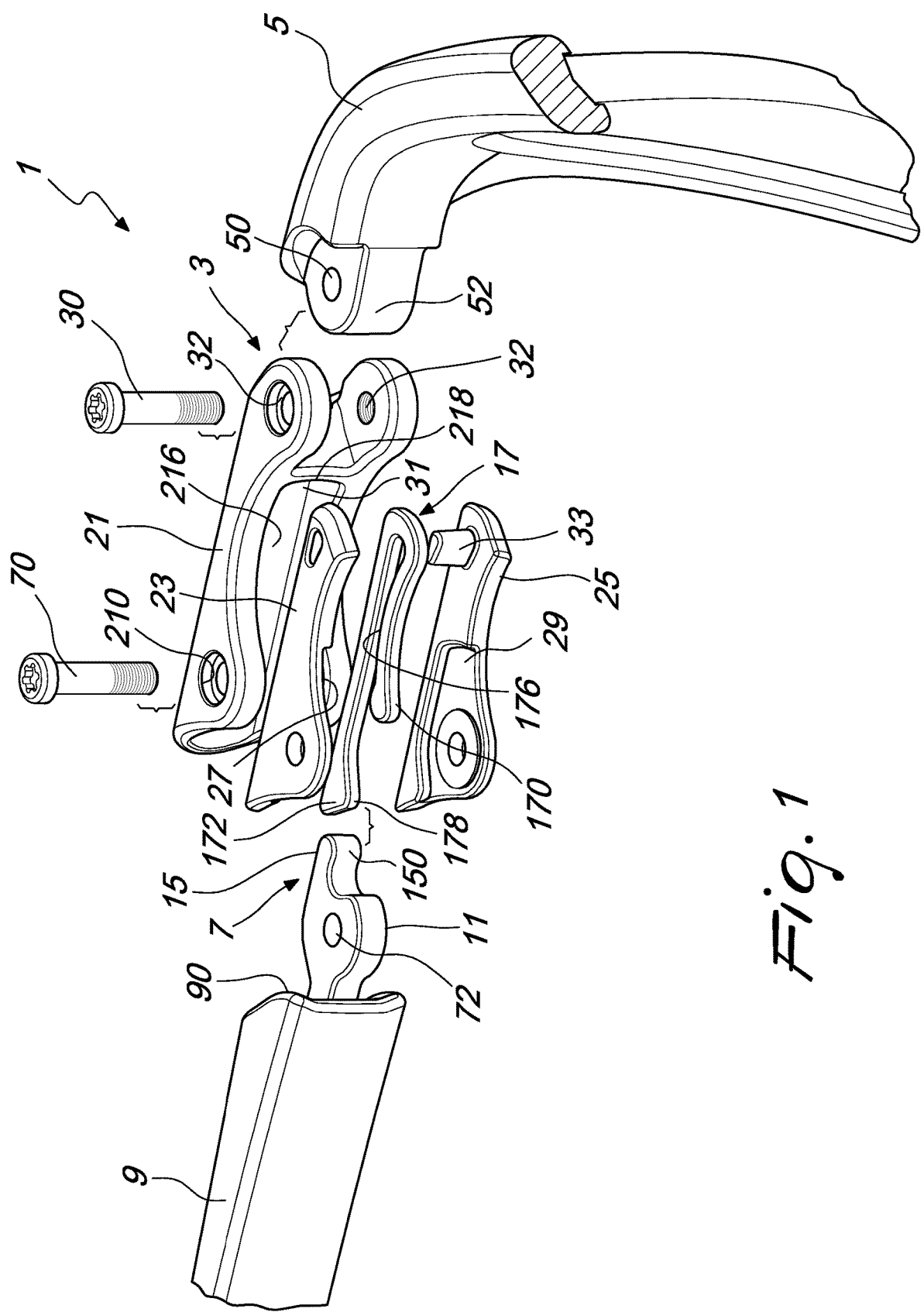
FIG. 1 is an exploded perspective view of an embodiment of a hinge, according to the disclosure.

With reference to FIGS. 1-3, a hinge for eyeglasses, generally designated by the reference numeral 1, comprises first means 3 for pivoting to a front 5 of eyeglasses, and second means 7 for pivoting to a temple 9 of eyeglasses.

According to the disclosure, the eyeglass frame structure comprises a leaf spring 17 which defines a cavity 176. Furthermore, according to the disclosure, the second pivoting means 7 comprise an abutment head 11 that can rotate about a rotation axis 13 and is configured to be associated rigidly with one end 90 of the temple 9. The abutment head 11 comprises a protrusion 15 which is inserted into the cavity 176 of the leaf spring 7 so as to be retained in the cavity 176. The rotation of the abutment head 11 about the rotation axis 13 in a first direction of rotation produces the flexing of the leaf spring 17 by the protrusion 15 and the rotation of the temple 9.

Advantageously the rotation of the abutment head 11 about the rotation axis 13 in a second direction of rotation, opposite to the first direction of rotation, is prevented by the abutment of the protrusion 15 against a wall 19 of the hinge 1.

The hinge 1 advantageously comprises an accommodation body 21 in which at least the second pivoting means 7 and the leaf spring 17 are accommodated.

The leaf spring 17 can be substantially U-shaped, and comprises a first, elastically flexible arm 170 that cooperates with the protrusion 15 and a second arm 172 which is coupled to the accommodation body 21. Between the two arms 170 and 172, the cavity 176 is advantageously defined into which the protrusion 15 of the abutment head 11 is inserted.

The second arm 172 can define the abutment wall 19 of the protrusion 15, which prevents the rotation of the temple 9 in the second direction of rotation.

The second pivoting means 7 comprise a pin, or screw, 70, which is associated with the accommodation body 21 and passes through a hole 72 provided in the abutment head 11. The pin 70 enables the pivoting of the abutment head 11, and of the temple 9 associated therewith, with the accommodation body 21. In fact the accommodation body 21 also advantageously comprises holes 210, one of which is optionally threaded, into which the pin 70 is inserted.

Advantageously the leaf spring 17 can be included between two retention plates 23, 25. The plates 23 and 25 retain the leaf spring 17 but allow the elastic deformation of its first arm 170.

Advantageously, at least one of the two retention plates 23 or 25 comprises a recess 27 or 29, which defines an accommodation seat for the abutment head 11. The recess 27 or 29 has a shape and size that are such as to allow the necessary degree of rotation of the abutment head 11 and of the corresponding protrusion 15.

As illustrated in the accompanying figures, both of the retention plates 23 and 25 can comprise respective recesses 27 and 29 which are adapted to define the accommodation seat of the abutment head 11.

Advantageously the assembly of the leaf spring 17 and the two retention plates 23 and 25 is inserted into a cavity 31 provided in the accommodation body 21.

Advantageously the two retention plates 23 and 25 can be parts of a single piece.

Advantageously, furthermore, the leaf spring 17 can be accommodated directly in the cavity 216 of the accommodation body 21, without being retained by retention plates.

The protrusion 15 advantageously has a curvilinear profile 150 that is configured to slide along a corresponding curvilinear profile 174 of the leaf spring 17. Advantageously, in the configuration of normal opening or closing of the temple 9, as shown in FIG. 2, the curvilinear profile 150 of the protrusion 15 is mated with the corresponding curvilinear profile 174 of the first arm 170 of the leaf spring 17 so as to retain the protrusion 15 within the cavity 176 between the two arms 170 and 172 of the leaf spring 17.

Advantageously furthermore, between the two retention plates 23 and 25, there is an insert 33 for retaining the leaf spring 17.

The leaf spring 17, which is U-shaped, is in fact advantageously arranged between the two retention plates 23 and 25 so that the U-shaped end portion thereof embraces the retention insert 33.

Advantageously the leaf spring 17 is pre-loaded so that when it is inserted into the accommodation body 21 it remains in position by virtue of the elastic force exerted on the walls of the accommodation body 21 proper, inside the cavity 31.

For example, the second arm 172 can have, at rest, a slightly concave or convex configuration. In this manner, when the leaf spring 17 is inserted into the hinge 1, the second arm 172 exerts an elastic force against the wall 216 of the accommodation body 21 which is such as to keep the leaf spring 17 in position. In FIGS. 2 and 3, the second arm 172 is shown in its elastically deformed configuration, in which it is aligned with the wall 216 of the accommodation body 21.

Advantageously the leaf spring 17 has a lug 178 configured to abut against the abutment head 11 in the over-open position. In this manner it is possible to prevent the accommodation body 21 or other components of the hinge 1 from coming into contact with the temple 9 and therefore from risking damage to the temple 9 proper.

The hinge 1 comprises first means 3 for pivoting to the front 5 of the eyeglass frame, which comprise a pin 30 associated with the accommodation body 21. The pin 30 allows the pivoting of the front 5 to the hinge 1, by way of holes 32.

The present disclosure further relates to eyeglasses that comprise the hinge 1 as described above.

The operations to assemble the hinge 1 and the corresponding eyeglass frame simply entail the insertion of the assembly of the leaf spring 17 and the retention plates 23 and 25 into the cavity 31 of the accommodation body 21 and the insertion of the abutment head 11 associated with the temple 9 into the recess 27, 29 so that the protrusion 15 is inserted into the cavity 176 of the leaf spring 17.

The insertion of the pin 70 into the accommodation body 21 and through the abutment head 11 makes it possible to lock the temple 9 to the hinge 1, with hinge-like coupling.

In fact the accommodation body 21 comprises a retaining wall 218 that, in cooperation with the pin 70, retains the leaf spring 17 and the plates 23 and 25 inside the cavity 31.

On the other side of the hinge 1, the insertion of the pin 30 into the accommodation body 21 and through a hole 50 provided in a flange 52 of the front 5 makes it possible to lock the front 5 to the hinge 1, with hinge-like coupling.

In practice it has been found that the hinge for eyeglasses, according to the present disclosure, achieves the intended aims and advantages in that it can be assembled and associated with eyeglasses in a very simple manner.

Another advantage of the hinge for eyeglasses, according to the disclosure, is that the eyeglasses are constituted by components that are simple to produce and assemble.

The hinge thus conceived is susceptible of numerous modifications and variations all of which are within the scope of the appended claims.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. 102015000086940 (UB2015A009318) from which this application claims priority are incorporated herein by reference.

The invention claimed is:

1. A hinge for eyeglasses, which comprises first means for pivoting to a front of eyeglasses, and second means for pivoting to a temple of eyeglasses, further comprising a leaf spring that defines a cavity and wherein said second pivoting means comprise an abutment head that can rotate about a rotation axis and is configured to be associated rigidly with one end of said temple, said abutment head comprising a protrusion inserted into said cavity of said leaf spring so as to be retained in said cavity, the rotation of said abutment head about said rotation axis in a first direction of rotation producing the flexing of said leaf spring by said protrusion and the rotation of said temple, wherein the rotation of said abutment head about said rotation axis in a second direction of rotation, opposite to said first direction of rotation, is prevented by the abutment of said protrusion against a wall of said hinge.

2. The hinge according to claim 1, further comprising an accommodation body, in which said second pivoting means and said leaf spring are accommodated.

3. The hinge according to claim 2, wherein said leaf spring is substantially U-shaped, and comprises a first elastically flexible arm that cooperates with said protrusion and a second arm which is coupled to said accommodation body, said cavity being defined between said first arm and said second arm.

4. The hinge according to claim 3, wherein said second arm of said leaf spring defines said wall.

5. The hinge according to claim 2, wherein said second pivoting means comprise a pin, which is associated with said accommodation body and passes through a hole provided in said abutment head.

6. The hinge according to claim 2, wherein said leaf spring is included between two retention plates.

7. The hinge according to claim 6, wherein at least one of said two retention plates comprises a recess that defines a seat for said abutment head.

8. The hinge according to claim 6, wherein an assembly of said leaf spring and said two retention plates is inserted into a cavity provided in said accommodation body.

9. The hinge according to claim 6, further comprising, between said two retention plates, an insert for the retention of said leaf spring.

10. The hinge according to claim 2, wherein said first pivoting means comprise a pin associated with said accommodation body.

11. The hinge according to claim 1, wherein said protrusion has a curvilinear profile which is configured to slide along a corresponding curvilinear profile of said leaf spring.

12. The hinge according to claim 1, wherein said leaf spring has a lug configured to abut against said abutment head.

13. Eyeglasses comprising a hinge according to claim 1.

* * * * *